US 12,060,052 B2

(12) United States Patent
Georgin et al.

(10) Patent No.: US 12,060,052 B2
(45) Date of Patent: Aug. 13, 2024

(54) VALVE ASSEMBLY FOR BRAKE CONTROL SYSTEM (71) Applicant: GOODRICH CORPORATION, Charlotte, NC (US)

(72) Inventors: Marc Georgin, Dayton, OH (US); Gregory Hickey, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 411 days.

(21) Appl. No.: 17/472,323

(22) Filed: Sep. 10, 2021

(65) Prior Publication Data

US 2023/0083075 A1    Mar. 16, 2023

(51) Int. Cl.
*B60T 8/94* (2006.01)
*B60T 8/17* (2006.01)
*B60T 8/172* (2006.01)
*B60T 13/68* (2006.01)
*B64C 25/44* (2006.01)

(52) U.S. Cl.
CPC .............. *B60T 8/94* (2013.01); *B60T 8/1703* (2013.01); *B60T 8/172* (2013.01); *B60T 13/686* (2013.01); *B64C 25/44* (2013.01)

(58) Field of Classification Search
CPC ........ B60T 8/17; B60T 8/1701; B60T 8/1703; B60T 8/1708; B60T 8/172; B60T 8/94; B60T 13/68; B60T 13/686; B60T 17/18; B60T 17/221; B60T 17/226

See application file for complete search history.

(56) References Cited

U.S. PATENT DOCUMENTS

| 5,429,424 | A | 7/1995 | Huber et al. |
| 6,789,857 | B2 | 9/2004 | Kusano |
| 7,946,660 | B2 * | 5/2011 | Diekmeyer ........... B60T 17/004 303/3 |
| 8,118,256 | B2 * | 2/2012 | Cahill ....................... B60T 8/00 60/403 |

(Continued)

FOREIGN PATENT DOCUMENTS

| EP | 2495142 | 9/2012 | |
| EP | 3421312 A1 * | 1/2019 | ............ B60T 13/662 |

(Continued)

OTHER PUBLICATIONS

European Patent Office, European Search Report dated Feb. 2, 2023 in Application No. 22193996.0.

(Continued)

*Primary Examiner* — Thomas J Williams
(74) *Attorney, Agent, or Firm* — SNELL & WILMER L.L.P.

(57) ABSTRACT

A valve assembly may comprise: a housing defining an inlet port, an outlet port, a solenoid valve inlet port, and a solenoid valve outlet port, the inlet port in fluid communication with the solenoid valve inlet port; a shutoff valve disposed in the housing, the shutoff valve including a shutoff valve inlet port in fluid communication with the inlet port and a shutoff valve outlet port in fluid communication with the outlet port, and a second shutoff valve inlet port in fluid communication with the solenoid valve outlet port; a filter disposed downstream of the valve inlet port; and a check valve disposed between the shutoff valve outlet port and the outlet port of the housing.

18 Claims, 7 Drawing Sheets

(56) References Cited

U.S. PATENT DOCUMENTS

| | | | |
|---|---|---|---|
| 8,282,173 B2* | 10/2012 | Forster | B60T 13/263 |
| | | | 303/7 |
| 9,290,166 B2* | 3/2016 | Harrison | B60T 8/323 |
| 10,723,337 B2 | 7/2020 | Burte | |
| 2019/0193704 A1 | 6/2019 | Zell et al. | |
| 2019/0193708 A1 | 6/2019 | Kordik et al. | |
| 2020/0017202 A1 | 1/2020 | Georgin et al. | |
| 2020/0290580 A1 | 9/2020 | Georgin | |
| 2021/0086734 A1 | 3/2021 | Georgin | |
| 2023/0074835 A1* | 3/2023 | Georgin | B60T 8/171 |
| 2023/0083075 A1* | 3/2023 | Georgin | B60T 13/66 |
| | | | 244/111 |

FOREIGN PATENT DOCUMENTS

| | | | | |
|---|---|---|---|---|
| EP | 4147922 | | 3/2023 | |
| JP | 2015523509 A | * | 8/2015 | |
| WO | WO-03053758 A1 | * | 7/2003 | B60T 13/683 |
| WO | WO-2020230896 A1 | * | 11/2020 | |

OTHER PUBLICATIONS

European Patent Office, European Office Action dated Feb. 5, 2024 in Application No. 22193996.0.

* cited by examiner

VALVE ASSEMBLY FOR BRAKE CONTROL SYSTEM

FIELD

The present disclosure relates generally to valves, and, more specifically, to hydraulic, pneumatic, or other systems and methods for shutoff valve control for aircraft brake systems.

BACKGROUND

Aircraft often include one or more landing gear that comprise one or more wheels. Wheels may comprise friction brakes which may be hydraulically operated to slow or stop the aircraft. Hydraulic systems include valves to control, direct, and supply pressure to brakes. Some valves provide proportional hydraulic pressure based on proportional control signal. Other valves provide simple open/closed functionality.

SUMMARY

A valve assembly is disclosed herein. The valve assembly may comprise: a housing defining an inlet port, an outlet port, a solenoid valve inlet port, and a solenoid valve outlet port, the inlet port in fluid communication with the solenoid valve inlet port; a shutoff valve disposed in the housing, the shutoff valve including a shutoff valve inlet port in fluid communication with the inlet port and a shutoff valve outlet port in fluid communication with the outlet port, and a second shutoff valve inlet port in fluid communication with the solenoid valve outlet port; a filter disposed downstream of the inlet port; and a check valve disposed between the shutoff valve outlet port and the outlet port of the housing.

In various embodiments, the valve assembly may further comprise a solenoid valve coupled to the housing. The solenoid valve may be configured to fluidly couple the solenoid valve inlet port to the solenoid valve outlet port in response to being energized. The valve assembly may be configured to fluidly couple the inlet port and the outlet port in response to the solenoid valve being energized. The valve assembly may further comprise a pressure transducer disposed between the check valve and the outlet port. The pressure transducer may be configured to continuously provide pressure measurements to a controller of a brake control system.

A brake control system is disclosed herein. The brake control system may comprise: a main hydraulic system in fluid communication with a hydraulic supply via a fluid intersection, the fluid intersection having an inlet, a first outlet in fluid communication with the main hydraulic system, and an outlet in fluid communication with an emergency hydraulic system; a valve assembly having a supply port in fluid communication with the outlet, the valve assembly comprising: the supply port; an outlet port; a solenoid valve; a shutoff valve; and a check valve disposed between the shutoff valve and the outlet port, the solenoid valve configured to open the shutoff valve and fluidly couple the supply port to the outlet port in response to being energized.

In various embodiments, the supply port is less than one foot from the outlet of the fluid intersection. The brake control system may further comprise a pressure transducer disposed between the check valve and the outlet port. The brake control system may further comprise a controller in electronic communication with the solenoid valve, the controller configured to energize the solenoid valve to provide hydraulic fluid to an emergency hydraulic system. The controller may be configured to: receive pressure data from a location downstream of the check valve; determine a pressure falls below a pressure threshold based on the pressure data; and command the solenoid valve to close in response to determining the pressure is below the pressure threshold. The controller may further be configured to send an indication of a hydraulic line burst in the emergency hydraulic system. The valve assembly may further comprise a filter disposed upstream of an intersection between a first fluid conduit and a second fluid conduit, the first fluid conduit in fluid communication with the solenoid inlet port of the solenoid valve, the second fluid conduit in fluid communication with the shutoff valve inlet port of the shutoff valve. The supply port may be fluidly coupled to an inlet port of the solenoid valve. An outlet port of the solenoid valve may be in fluid communication with the shutoff valve. The shutoff valve may actuate to an open position in response to the solenoid valve opening and providing a fluid to the shutoff valve.

A control system of a brake control system is disclosed herein. The control system may comprise: a pressure transducer disposed downstream of a check valve in an emergency hydraulic system; a valve assembly including a solenoid valve and the check valve disposed therein; and a controller in electronic communication with the solenoid valve and the pressure transducer, the controller configured to: receive, from the pressure transducer, a pressure data; and de-energize the solenoid valve to transition the solenoid valve from an open position to a closed position in response to a pressure in the pressure data falling below a pressure threshold.

In various embodiments, the controller is further configured to send an indication of a hydraulic line burst in the emergency hydraulic system in response to the pressure falling below the pressure threshold. The valve assembly may include the pressure transducer. The pressure data may be received from a location downstream of the check valve.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). As used herein, "transmit" may include sending electronic data from one system component to another via electronic communication between the components. Additionally, as used herein, "electronic data" may include encompassing information such as commands, queries, files, data for storage, and the like in digital or any other form.

In a typical brake control system ("BCS"), a hydraulic pump provides power to the normal brake system and the emergency system. If the hydraulic line of the emergency system bursts, the burst may be isolated from a main hydraulic supply in order to maintain hydraulic supply to the rest of the system and not deplete the aircraft hydraulic reservoir. Adding an emergency refill valve ("ERV") below along a first supply line to mitigate a burst condition is not optimal because a burst would not be detectable between the ERV and a check valve.

Disclosed herein is a valve assembly including a check valve and a shutoff valve. In this regard, the valve assembly is configured as an inlet filter, a check valve, a solenoid valve, and a shutoff valve, in accordance with various embodiments. In various embodiments, the valve assembly may be strategically positioned within a brake system architecture between a supply intersection and an emergency park brake valve ("EPBV"). In various embodiments, by having a dual purpose valve assembly as disclosed herein, a burst between a shutoff valve and a check valve, which would be undetectable, is minimized. For example, the distance between the check valve and the shutoff valve is significantly reduced, and both the shutoff valve and the check valve are disposed in a monolithic module, limiting additional potential dynamic stresses of the system during operation of an aircraft.

Figure 1:
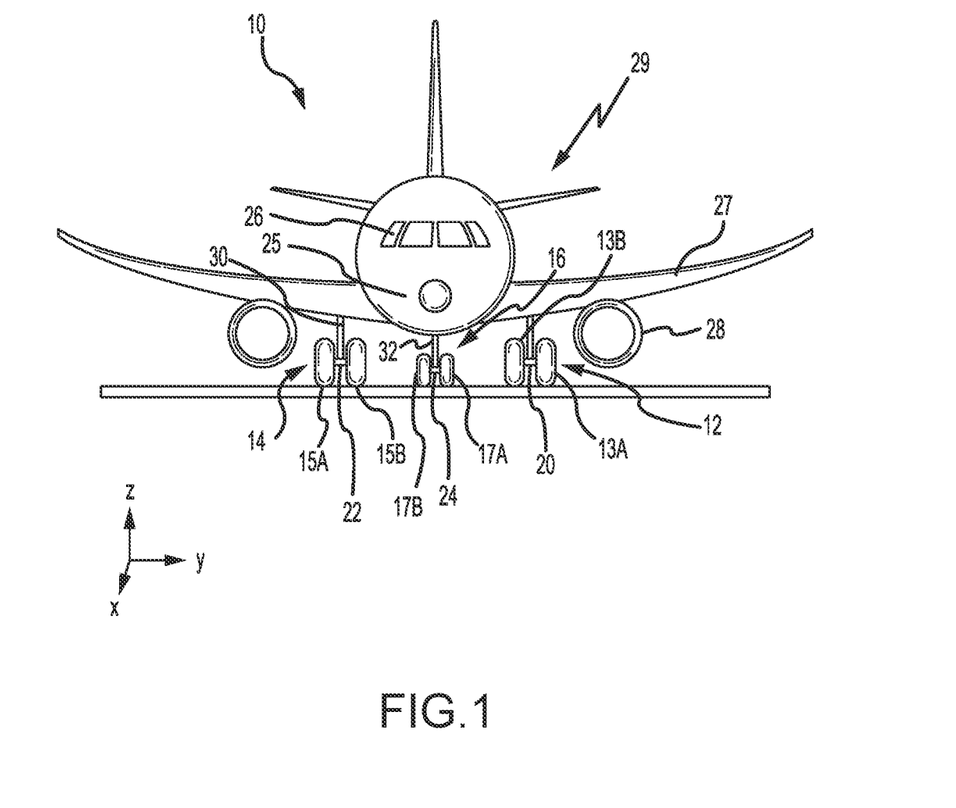
FIG. 1 illustrates an aircraft, in accordance with various embodiments.

With reference to FIG. 1, an aircraft 10 in accordance with various embodiments may comprise aircraft systems, for example, landing gear 12, landing gear 14 and landing gear 16. Landing gear 12, landing gear 14 and landing gear 16 may generally support aircraft 10 when aircraft is not flying, allowing aircraft 10 to taxi, take off, and land without damage and may comprise an electronic taxi system. Landing gear 12 may include wheel 13A, comprising a friction brake, and wheel 13B comprising a friction brake, coupled by an axle 20. Landing gear 14 may include wheel 15A comprising a friction brake, and wheel 15B comprising a friction brake, coupled by an axle 22. Landing gear 16 may include nose wheel 17A, and nose wheel 17B, coupled by an axle 24. Any of the friction brakes may be hydraulically operated and may include a proportional control valve to facilitate modulation of brake pressure (i.e., provide a proportional hydraulic pressure to actuate the friction brake) and shutoff valve to inhibit an un-commanded brake condition of the friction brakes. If a hydraulic line of an emergency system of a landing gear 12, 14, 16 bursts, the burst is isolated from a main hydraulic supply in order to maintain hydraulic supply to a remainder of the system.

Aircraft 10 may comprise Brake Control Unit ("BCU") 25, cockpit controls 26, aerodynamic surfaces 27, and propulsion system 28. Landing gear 14, landing gear 16, and landing gear 12 may be in communication with BCU 25 and may receive commands from BCU 25, for example, to apply friction brakes. In various embodiments, the BCU is typically located in the fuselage of the aircraft. Wires may extend between the fuselage and the BCU at the location of the wheels. The BCU 25 may receive signals or commands from a pilot, from sources external to the aircraft, or from any other suitable onboard sensors known to those skilled in the art. In various embodiments, BCU 25 may be in electronic communication with cockpit controls 26, a valve assembly 30, ground controls 32, and/or may be in electronic communication with external systems via external command signals 29 such as, for example, radio signals. The BCU 25 may control the valve assembly 30 in response to the cockpit controls 26, ground controls 32, or external command signals 29. In various embodiments, the BCU 25 may command the valve assembly 30 to close to isolate a burst hydraulic line from a main hydraulic supply to maintain hydraulic supply to the remainder of the system.

The BCU 25 may receive feedback from the valve assembly 30 such as, for example, position feedback, electrical feedback, and/or any other suitable input data. In various embodiments, the feedback may be direct feedback or sensor feedback. The BCU 25 may control the valve assembly 30 in response to the feedback and/or any other suitable input data. In various embodiments, the BCU 25 may be in electronic communication with the full suite of aircraft sensors and other data sources available within and without the aircraft such as, for example, GPS, radio beacons, remote commands and the like. Sensors may provide aircraft speed, wheel speed, brake temperature, Weight-on-Wheels ("WoW") status, landing gear position, pedal position, autobrake setting, thrust reverser position, throttle position, acceleration, aircraft flight phase, and any other suitable input data. The BCU 25 may coordinate the inputs of various sensors with internally stored data or configuration settings and based on the shutoff valve control logic may control the shutoff valve.

Figure 2:
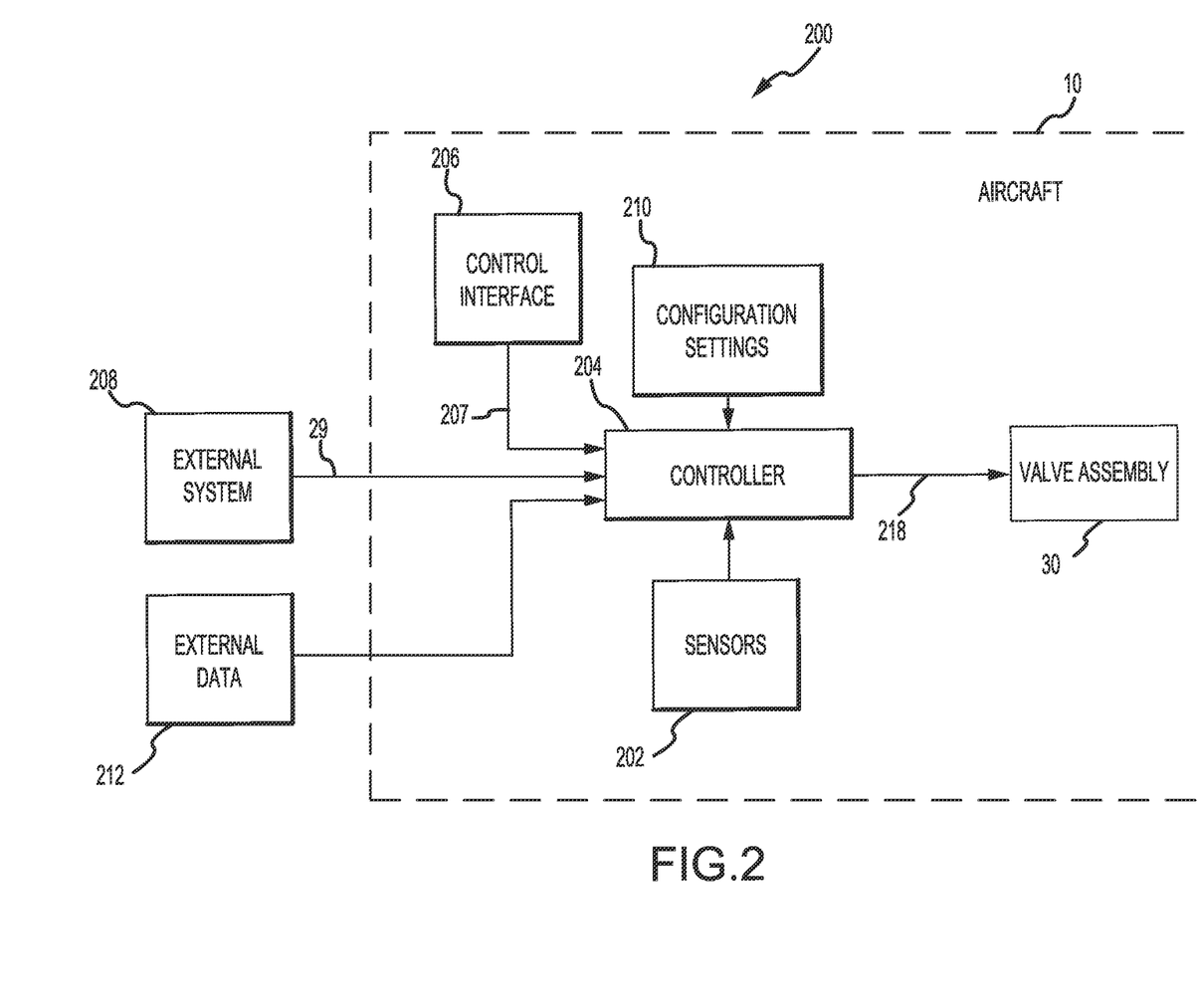
FIG. 2 illustrates a block diagram for a system for shutoff valve control, in accordance with various embodiments.

In various embodiments, and with reference to FIGS. 1 and 2, a system 200 for supply line burst detection system for an aircraft 10 is configured to detect a supply line burst and protect a remainder of a brake hydraulic system 300 as disclosed further herein. For example, sensors 202 may be coupled to or in direct electronic communication with aircraft systems such as, for example, landing gear 14 comprising a valve assembly 30. Sensors 202 may comprise a temperature sensor, a torque sensor, a speed sensor, a pressure sensor, a position sensor, an accelerometer, or any other suitable measuring device known to those skilled in the art. Sensors 202 may be configured to measure a characteristic of an aircraft system or component. Sensors 202 may be configured to measure, for example, a landing gear wheel speed, a friction brake pressure, an aircraft airspeed, or a weight-on-wheels ("WOW") condition. Sensors 202 may be configured to transmit the measurements to controller 204, thereby providing sensor feedback about the aircraft system to controller 204. The sensor feedback may be, for example, a speed signal, or may be position feedback, temperature feedback, pressure feedback or other data.

In various embodiments, controller 204 may be in electronic communication with a pilot through a control interface 206 of cockpit controls 26, for example, a switch, a pedal or set of pedals that a pilot can operate. The control interface 206 may output a measure of, for example, pedal deflection or switch position, and such output may be used as command signals 207. In various embodiments, controller 204 may be in electronic communication with an external system 208 through external command signals 29. In various embodiments, the information or instruction issued by the pilot or the external system via the command signals is of the form of "open shutoff valve" or "close shutoff valve." In various embodiments, external command signals 29 may include, commands generated from ground controls 32 such as an aircraft handler's control panel located proximate the landing gear 16. In various embodiments, the external command signals may be generated remotely and transmitted via radio to the aircraft 10 and controller 204. In various embodiments, controller 204 may be in electronic communication with configuration settings 210 or library values used by a shutoff valve control logic or other algorithm. In various embodiments, controller 204 may be in electronic communication with external data 212 sources which may be used by the shutoff valve control logic or other algorithm.

In various embodiments, controller 204 may be integrated into computer systems onboard an aircraft, such as, for example, BCU 25. In various embodiments, controller 204 may comprise a processor. In various embodiments, controller 204 may be implemented in a single processor. In various embodiments, controller 204 may be implemented as and may include one or more processors and/or one or more tangible, non-transitory memories and be capable of implementing logic. Each processor can be a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof. Controller 204 may comprise a processor configured to implement various logical operations in response to execution of instructions, for example, instructions stored on a non-transitory, tangible, computer-readable medium configured to communicate with controller 204.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

In various embodiments, one of sensors 202 is a pressure sensor disposed between a check valve of valve assembly 30, as described further herein, and an emergency park/brake valve ("EPBV") 336 (see FIG. 3) of an emergency hydraulic system. The pressure sensor is configured to provide pressure data to the controller 204 during operation. In this regard, in response to the controller receiving a pressure measurement from the pressure sensor that falls below a pressure threshold, the controller 204 may detect a burst in the emergency hydraulic system 303 (see FIG. 3), in accordance with various embodiments.

Figure 3:
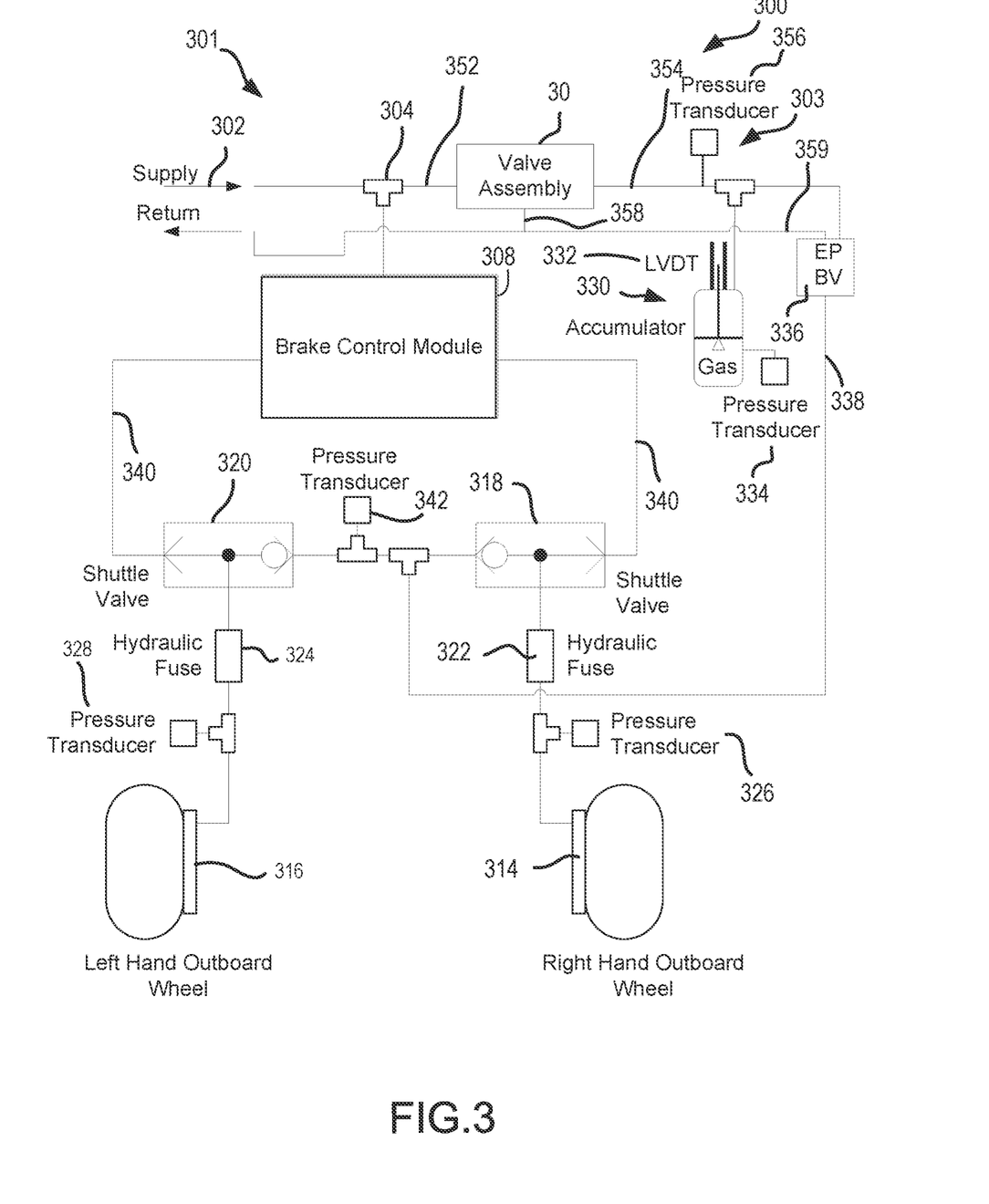
FIG. 3 illustrates a schematic diagram of a brake hydraulic system, in accordance with various embodiments.

In various embodiments and with additional reference to FIG. 3 a schematic diagram of a brake hydraulic system 300 including the valve assembly 30 is illustrated. Valve assembly 30 is in fluid communication with a hydraulic supply 302 via fitting 304. The valve assembly 30 is configured to interrupt fluid communication between the hydraulic supply 302 and the EPBV 336. In this regard, the valve assembly 30 is configured to isolate a main hydraulic system 301 from an emergency hydraulic system 303 in response to a hydraulic line burst in the emergency hydraulic system 303 as described further herein. In various embodiments, an emergency supply line 352 extends from the fitting 304 to an inlet port of the valve assembly 30. An emergency supply line 354 extends from an outlet port of the valve assembly 30 to the emergency hydraulic system 303.

In various embodiments, the valve assembly 30 facilitates detection of a burst in a hydraulic line downstream of the valve assembly 30 (i.e., in the emergency hydraulic system 303). For example, a check valve and a shutoff valve are integrated into the valve assembly 30. Thus, any pressure sensor in the emergency hydraulic system 303 would detect a decrease in pressure occurring from a hydraulic line burst in the emergency hydraulic system since the pressure transducer would be located downstream of the check valve. In various embodiments, the pressure transducer may be integrated into the valve assembly 30 downstream of the check valve.

In various embodiments, the valve assembly 30 is a multi-purpose valve assembly as described further herein. In this regard, the valve assembly 30 is configured as a combination of an inlet filter, a check valve, and a solenoid shutoff valve. In various embodiments, a pressure transducer 356 is disposed on the emergency supply line 354 between the valve assembly 30 and an emergency park brake valve (EPBV) 336. However, the present disclosure is not limited in this regard. For example, the pressure transducer 356 may be disposed within, or a component of, the valve assembly 30 as described further herein. In various embodiments, the valve assembly 30 may be disclosed in close proximity to the fitting 304. "Close proximity," as disclosed herein refers to being within two feet (0.66 m), within three feet (1 m), or within one foot (0.3 meters) of the fitting 304 (i.e., the intersection fitting). In various embodiments, the closer the valve assembly 30 is to the fitting, the remaining fluid lines of the brake hydraulic system 300 may receive a greater amount of protection, in accordance with various embodiments. In various embodiments, a return line 358 extends from valve assembly 30 to an intersection with a return line 359 from the EPBV 336.

System 300 may further include a brake control module 308. The brake control module 308 may be in electronic communication with controller 204 and each of the valves therein may be configured to be controlled by controller 204. The first proportional control valve of brake control module 308 may be in fluid communication with a first friction brake assembly 314 via primary supply lines 340 thereby enabling pressure control of the respective friction brake.

In various embodiments, a first shuttle valve 318 and a second shuttle valve 320 may be coupled to an emergency brake supply line 338 and configured to selectively receive hydraulic input pressure therefrom. The emergency brake supply line 338 is in fluid communication with the EPBV 336 which may be in fluid communication with a hydraulic accumulator 330. In this regard, hydraulic accumulator 330 may be configured as an alternate supply of hydraulic pressure to the friction brake assemblies (314, 316) via the shuttle valves (318, 320) in response to opening the EPBV 336.

In various embodiments, system 300 includes one or more sensors in electronic communication with controller 204. For example, system 300 may include pressure transducers such as a first brake pressure transducer 326, a second brake pressure transducer 328, an emergency system pressure transducer 342, and an accumulator pressure transducer 334. System 300 may include fluid level sensors such as an accumulator level sensor 332 and/or the like. In various embodiments, system 300 may include one or more hydraulic fuses (322, 324) which may tend to limit a loss of hydraulic fluid in the event of damage to hydraulic system elements.

Figure 4A:
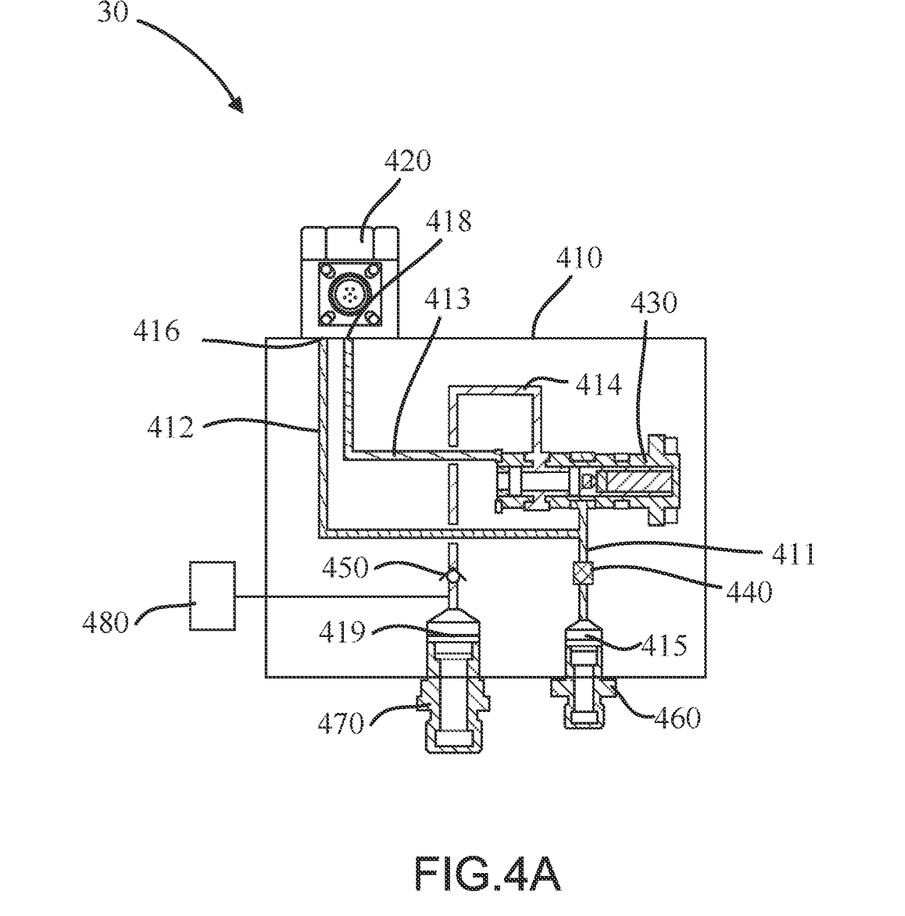
FIG. 4A illustrates an internal view of a valve assembly, in accordance with various embodiments.

Referring now to FIG. 4A, an internal view of the valve assembly 30 from FIG. 3 is illustrated, in accordance with various embodiments. The valve assembly 30 comprises a housing 410, a solenoid valve 420, a shutoff valve 430, an inlet filter 440, a check valve 450, a supply port 460, and an outlet port 470. In various embodiments, the solenoid valve 420, the supply port 460, and the outlet port 470 may be coupled to the housing 410. In various embodiments, the inlet filter 440, the check valve 450, and the shutoff valve 430 are disposed within the housing 410. In various embodiments, the inlet filter 440 may be integral (i.e., formed as a single piece or monolithic) with the supply port 460. In various embodiments, the housing 410 defines an inlet port 415 configured to receive the supply port 460. Similarly, the housing 410 defines an outlet port 419 configured to receive the outlet port 470. Although illustrated as being coupled to the housing 410, the supply port 460 and outlet port 470 are not limited in this regard. For example, the ports 460, 470 may be integral with the housing 410. In various embodiments, the housing further defines a solenoid inlet port 416 and a solenoid outlet port 418. The solenoid inlet port 416 is configured to interface with an inlet of the solenoid valve 420 and the solenoid outlet port 418 is configured to interface with an outlet port of the solenoid valve 420.

In various embodiments, the housing 410 is configured to have fluid conduits disposed therethrough. For example, the supply port 460 is in fluid communication with the shutoff valve via a first fluid conduit 411. In various embodiments, the inlet filter 440 may be coupled to the fluid conduit 411 and be configured to filter fluid flowing therethrough. In this regard, the inlet filter 440 may protect an internal mechanism of the shutoff valve 430 from contamination, in accordance with various embodiments. In various embodiments, a second fluid conduit 412 extends from an intersection of the first fluid conduit 411 to an inlet of the solenoid valve 420. In various embodiments, a third fluid conduit 413 extends from the solenoid valve 420 to the shutoff valve 430. The solenoid valve 420 is a normally closed solenoid valve. In this regard, in response to be energized, the solenoid valve 420 transitions from a closed position to an open position, fluidly coupling the supply port 460 to the shutoff valve 430 through the solenoid valve 420. In this regard, pressure from fluid flowing to the shutoff valve 430 through the solenoid may actuate the shutoff valve 430, fluidly coupling the supply port 460 to the outlet port 470. Thus, in response to the solenoid valve 420 being energized, supply port 460 and the outlet port 470 become fluidly coupled through the shutoff valve 430, in accordance with various embodiments.

In various embodiments, a fourth fluid conduit 414 extends from the shutoff valve 430 to the outlet port 470. In various embodiments, a check valve 450 is coupled to the fourth fluid conduit 414. In this regard, in various embodiments, the check valve 450 is configured to prevent backflow in the valve assembly 30. In various embodiments, a pressure transducer 480 may be disposed between the check valve 450 and the outlet port 470. Although illustrated as including the pressure transducer 480 disposed between the check valve 450 and the outlet port 470, the present disclosure is not limited in this regard. For example, the pressure transducer 480 may be disposed further downstream (i.e., as long as the pressure transducer 480 is disposed on the emergency supply line 354 between the valve assembly 30 and the EPBV 336 in the hydraulic system, in accordance with various embodiments.

Figure 4B:
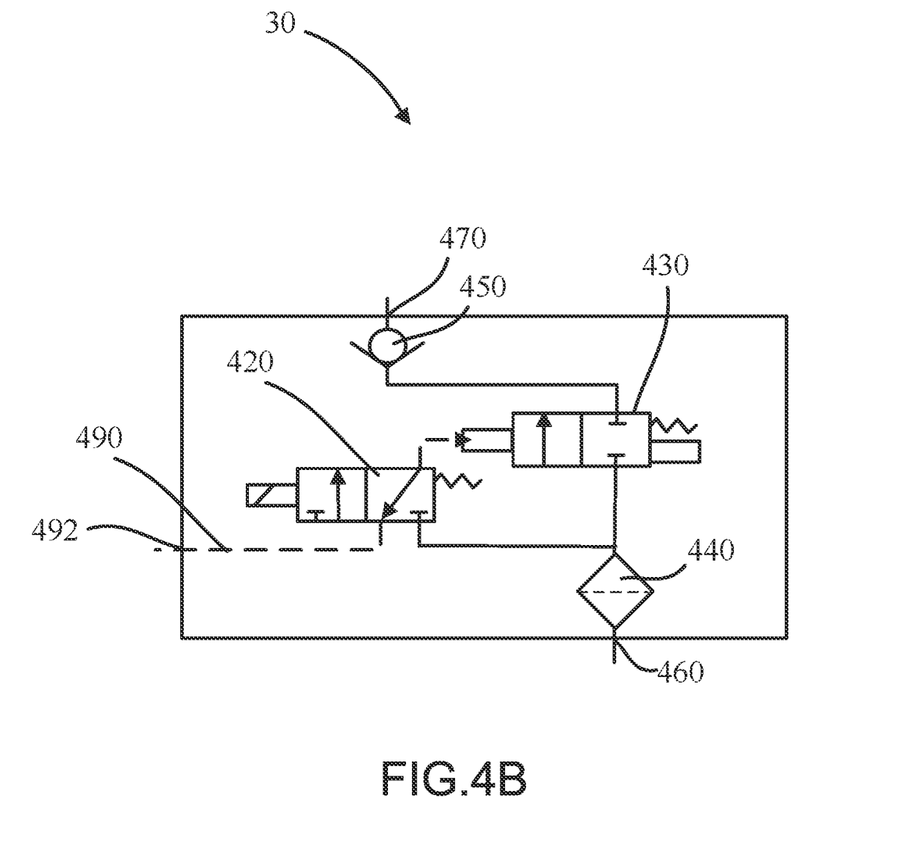
FIG. 4B illustrates a schematic view of a valve assembly, in accordance with various embodiments.

Referring now to FIG. 4B, a schematic view of the valve assembly 30 from FIG. 4A is illustrated, where like numerals denote like elements, in accordance with various embodiments. In various embodiments, the valve assembly 30 further comprises a return line 490 extending from the shutoff valve 430 and the solenoid valve 420 to a return port 492. In various embodiments, the return port 492 is configured to return a fluid back to a reservoir of the brake hydraulic system 300 from FIG. 3. In various embodiments, the return port is in fluid communication with the return line 358 from FIG. 3.

Figure 5:
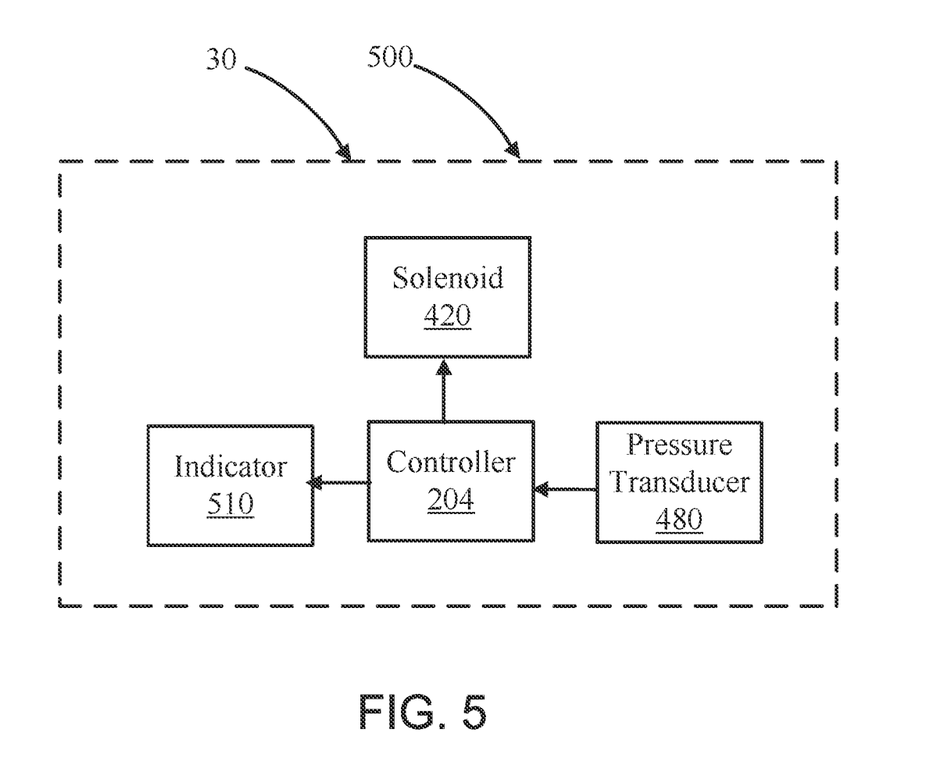
FIG. 5 illustrates a control system for a brake hydraulic system, in accordance with various embodiments.

Referring now to FIG. 5, a control system 500 for a valve assembly 30 from FIG. 4A is illustrated, in accordance with various embodiments. The control system 500 comprises the controller 204 from FIG. 2, the solenoid valve 420 of valve assembly 30 from FIG. 4A, and the pressure transducer 480 from FIG. 4A. Although illustrated with the pressure transducer 480 from FIG. 4A, the present disclosure is not limited in this regard.

In various embodiments, the pressure transducer 480 is configured to continuously measure a pressure of pressurized fluid disposed through valve assembly 30 from FIG. 3. For example, the pressure transducer 480 may measure a pressure every 2.5 milliseconds and output a pressure signal to the controller 204 (i.e., provide pressure data to the controller 204).

In various embodiments, the control system 500 further comprises an indicator 510. The indicator 510 may be a display device, a light, or the like. In this regard, the indicator 510 may be configured to provide an indication of a hydraulic line burst in an emergency hydraulic system to a pilot or the like, in accordance with various embodiments.

Figure 6:
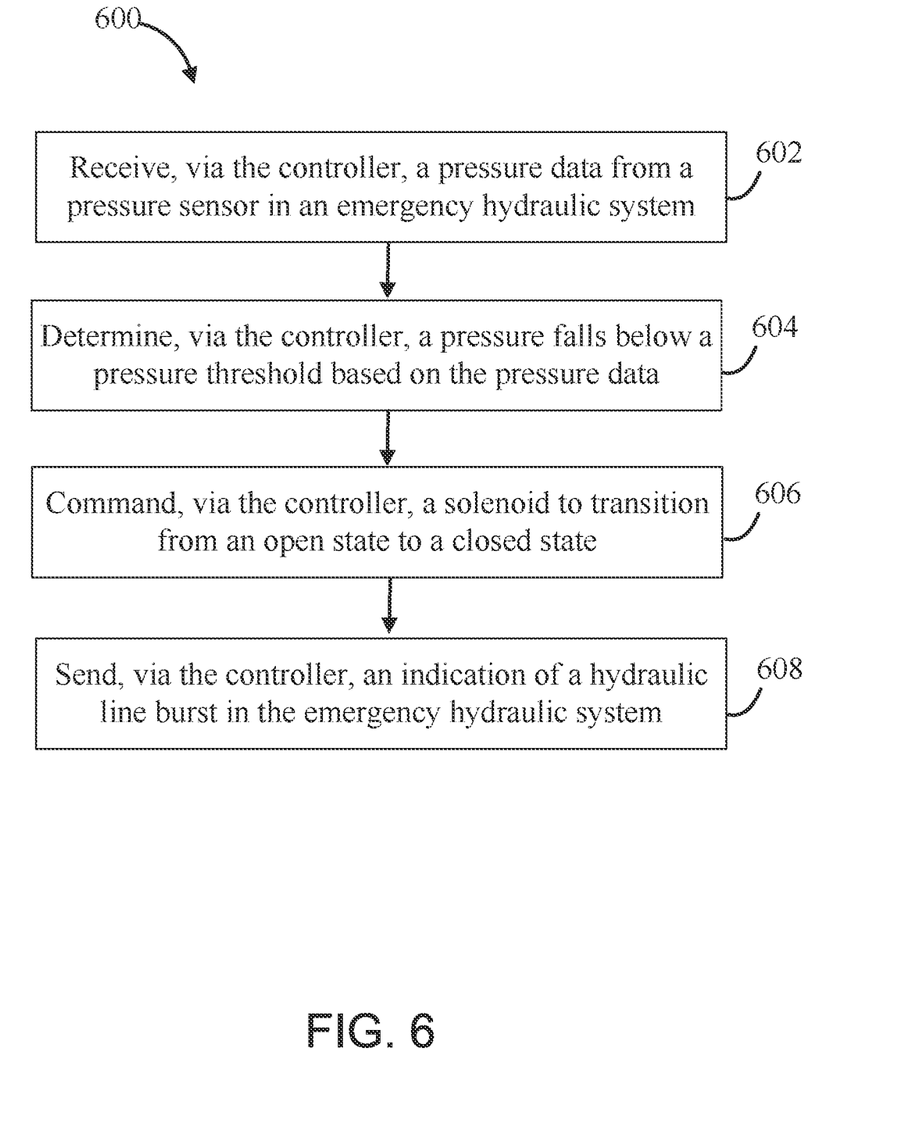
FIG. 6 illustrates a process for the control system of FIG. 5, in accordance with various embodiments.

Referring now to FIG. 6, a process 600 for controller 204 of the control system 500 for the valve assembly 30 is illustrated, in accordance with various embodiments. With combined reference to FIGS. 5 and 6, The process 600 comprises receiving, via a controller 204, a pressure data from a pressure transducer 480 in an emergency hydraulic system (step 602). The pressure transducer 480 is disposed downstream of a check valve 450 disposed in a valve assembly 30 coupled to an emergency supply line 352 from FIG. 3. In various embodiments, the emergency supply line 352 may be less than two feet, or less than one foot in length as described previously herein.

In various embodiments, the process 600 further comprises determining, via the controller 204, a pressure falls below a pressure threshold based on the pressure data (step 604). In this regard, the pressure threshold may be a design consideration that indicates that a burst has occurred in the emergency hydraulic system. Thus, in response to falling below the pressure threshold, the controller 204 determines that a burst in the emergency hydraulic system 303 from FIG. 3 has occurred and further action is taken to protect the main hydraulic system 301 and alert a pilot or the like as described further herein.

The process 600 further comprises commanding, via the controller 204, a solenoid valve 420 to transition from an open state to a closed state (step 606). In this regard, the controller 204 may command the solenoid valve 420 of valve assembly 30 from FIGS. 3 and 4A-B to de-energize (i.e., by shutting of a voltage supply to the solenoid valve 420). In this regard, the solenoid valve 420 may be a normally closed solenoid valve configured to be energized to open, in accordance with various embodiments. Although described herein as being a normally closed solenoid valve, the present disclosure is not limited in this regard.

The process 600 further comprises sending, via the controller 204, an indication of a hydraulic line burst in the emergency hydraulic system (step 608). The controller 204 may send the indication to an indicator 510 in accordance with various embodiments. The indicator 510 may be in a cockpit of an aircraft or the like. In this regard, the control system 500 and process 600 may be configured to provide an indication of a hydraulic line burst in an emergency hydraulic system 303 from FIG. 3, in accordance with various embodiments.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein invokes 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A valve assembly, comprising:
a housing defining an inlet port, an outlet port, a solenoid valve inlet port, and a solenoid valve outlet port, the inlet port in fluid communication with the solenoid valve inlet port;
a shutoff valve disposed in the housing, the shutoff valve including a shutoff valve inlet port in fluid communication with the inlet port and a shutoff valve outlet port in fluid communication with the outlet port, and a second shutoff valve inlet port in fluid communication with the solenoid valve outlet port;
a filter disposed in the housing downstream of the inlet port; and
a single flow check valve disposed in the housing between the shutoff valve outlet port and the outlet port of the housing.

2. The valve assembly of claim 1, further comprising a solenoid valve coupled to the housing.

3. The valve assembly of claim 2, wherein the solenoid valve is configured to fluidly couple the solenoid valve inlet port to the solenoid valve outlet port in response to being energized.

4. The valve assembly of claim 3, wherein the valve assembly is configured to fluidly couple the inlet port and the outlet port in response to the solenoid valve being energized.

5. The valve assembly of claim 1, further comprising a pressure transducer disposed between the check valve and the outlet port.

6. The valve assembly of claim 5, wherein the pressure transducer is configured to continuously provide pressure measurements to a controller of a brake control system.

7. A brake control system, comprising:
a main hydraulic system in fluid communication with a hydraulic supply via a fluid intersection, the fluid intersection having an inlet, a first outlet in fluid communication with the main hydraulic system, and a second outlet in fluid communication with an emergency hydraulic system;
a valve assembly having a supply port in fluid communication with the second outlet, the valve assembly comprising:
the supply port;
an outlet port;
a solenoid valve;
a shutoff valve; and
a check valve disposed between the shutoff valve and the outlet port, the solenoid valve configured to open the shutoff valve and fluidly couple the supply port to the outlet port in response to being energized; and
a controller in electronic communication with the solenoid valve, the controller configured to energize the solenoid valve to provide hydraulic fluid to an emergency hydraulic system, wherein the controller is configured to:
receive pressure data from a location downstream of the check valve;
determine whether a pressure falls below a pressure threshold based on the pressure data; and
command the solenoid valve to close in response to determining the pressure is below the pressure threshold.

8. The brake control system of claim 7, wherein the supply port is less than one foot from the second outlet of the fluid intersection.

9. The brake control system of claim 7, further comprising a pressure transducer disposed between the check valve and the outlet port.

10. The brake control system of claim 7, wherein the controller is further configured to send an indication of a hydraulic line burst in the emergency hydraulic system.

11. The brake control system of claim 7, wherein the valve assembly further comprises a filter disposed upstream of an intersection between a first fluid conduit and a second fluid conduit, the first fluid conduit in fluid communication with a solenoid inlet port of the solenoid valve, the second fluid conduit in fluid communication with a shutoff valve inlet port of the shutoff valve.

12. The brake control system of claim 7, wherein the supply port is fluidly coupled to an inlet port of the solenoid valve.

13. The brake control system of claim 12, wherein a solenoid valve outlet port of the solenoid valve is in fluid communication with the shutoff valve.

14. The brake control system of claim 13, wherein the shutoff valve actuates to an open position in response to the solenoid valve opening and providing a fluid to the shutoff valve.

15. A control system of a brake control system, the control system comprising:
a pressure transducer disposed downstream of a check valve in an emergency hydraulic system;
a valve assembly including a solenoid valve and the check valve disposed therein; and
a controller in electronic communication with the solenoid valve and the pressure transducer, the controller configured to:
receive, from the pressure transducer, a pressure data; and
de-energize the solenoid valve to transition the solenoid valve from an open position to a closed position in response to a pressure in the pressure data falling below a pressure threshold.

16. The control system of claim 15, wherein the controller is further configured to send an indication of a hydraulic line burst in the emergency hydraulic system in response to the pressure falling below the pressure threshold.

17. The control system of claim 16, wherein the valve assembly includes the pressure transducer.

18. The control system of claim 15, wherein the pressure data is received from a location downstream of the check valve.

* * * * *